(12) United States Patent
Patton

(10) Patent No.: US 7,963,443 B2
(45) Date of Patent: Jun. 21, 2011

(54) SYSTEMS, METHODS, AND COMPUTER PROGRAM PRODUCTS FOR MITIGATING SIGNAL NOISE AT A WIRELESS SMART DEVICE READER

(75) Inventor: James Patton, Salinas, CA (US)

(73) Assignee: ViVOtech, Inc., Santa Clara, CA (US)

( * ) Notice: Subject to any disclaimer, the term of this patent is extended or adjusted under 35 U.S.C. 154(b) by 614 days.

(21) Appl. No.: 11/967,383

(22) Filed: Dec. 31, 2007

(65) Prior Publication Data

US 2009/0166419 A1   Jul. 2, 2009

(51) Int. Cl.
*G06K 7/08* (2006.01)
(52) U.S. Cl. ....................................................... 235/451
(58) Field of Classification Search ................ 235/451; 714/5
See application file for complete search history.

(56) References Cited

U.S. PATENT DOCUMENTS

| 6,655,588 B2* | 12/2003 | Fukazawa ............... 235/437 |
| 2003/0106942 A1* | 6/2003 | Ohya et al. ............... 235/492 |
| 2003/0120991 A1* | 6/2003 | Calle et al. ............... 714/776 |
| 2005/0120260 A1* | 6/2005 | Suzuki et al. ............... 714/5 |
| 2005/0229071 A1* | 10/2005 | Uga ............................. 714/748 |
| 2008/0068134 A1* | 3/2008 | Kimura ....................... 340/10.1 |

OTHER PUBLICATIONS

Baddeley (ed.), "Identification Cards—Contactless Integrated Circuit(s) Cards—Proximity Cards; Part 3: Initialization and Anticollision," ISO/IEC 14443-3, pp. 1-48 (Jun. 11, 1999).
Baddeley (ed.), "Identification Cards—Contactless Integrated Circuit(s) Cards—Proximity Cards; Part 2: Radio Frequency Power and Signal Interface," ISO/IEC 14443-2, pp. 1-16 (Mar. 26, 1999).

\* cited by examiner

*Primary Examiner* — Thien M. Le
*Assistant Examiner* — Christle I Marshall
(74) *Attorney, Agent, or Firm* — Jenkins, Wilson, Taylor & Hunt, P.A.

(57) ABSTRACT

Systems, methods, and computer program products for mitigating signal noise at a wireless smart device reader are disclosed. According to one aspect, the subject matter described herein includes a method (performed at a wireless smart device reader) that includes receiving a signal from a wireless smart device and checking for an error in a portion of the signal. In response to detecting the error, an error flag is set in an error register to indicate the presence of noise in the signal portion. The error register is repeatedly polled in order to detect the setting of the error flag. In response to detecting the setting of the error flag, a command to eliminate the signal portion is issued.

21 Claims, 3 Drawing Sheets

SYSTEMS, METHODS, AND COMPUTER PROGRAM PRODUCTS FOR MITIGATING SIGNAL NOISE AT A WIRELESS SMART DEVICE READER

TECHNICAL FIELD

The subject matter described herein relates to utilizing monitoring mechanisms to improve communication transactions at wireless smart device readers. More particularly, the subject matter described herein relates to systems, methods, and computer program products for mitigating signal noise at a wireless smart device reader.

BACKGROUND

With the success and widespread prevalence of the use of credit and debit cards for banking transactions, card issuers, such as banks and financial institutions, have turned to wireless smart devices as a means to provide their customers with a more powerful set of features than is possible using a traditional magnetic stripe ("magstripe") credit card.

As used herein, the term "wireless smart device" refers to a device with processing capabilities that can communicate wirelessly via an electric and/or magnetic field with another device, such as a wireless terminal or reader (e.g., a contactless card reader or wireless smart device reader). The wireless smart device may be equipped with an on-board memory or other storage capacity and may contain one or more applications that perform a particular function. Examples of wireless smart devices include contactless cards, contactless fobs, and mobile phones or personal digital assistants (PDAs) provisioned with soft cards.

One type of wireless communications that is conducted between a wireless smart device and a wireless smart device reader is near field communications (NFC). In one form of NFC, a wireless smart device may communicate with a wireless smart device reader via the inductive coupling of the device reader antenna to the device antenna. In one scenario, these two loop antennas effectively form a transformer to generate an electromagnetic field. The wireless smart device reader uses amplitude modulation (AM) to manipulate the radio frequency (RF), or electromagnetic, field in order to send information to the wireless smart device. The wireless smart device, in turn, communicates with the wireless smart device reader by modulating the loading on the wireless smart device antenna, which consequently modulates the load on the wireless smart device reader antenna.

When a wireless smart device communicates with a device reader via RF, a number of environmental and technical elements may come together to distort communications. One problem that typically occurs during communications between a wireless smart device reader and a wireless smart device is the amount of noise that is generated from the NFC connection, such as electromagnetic disturbance (EMD). Many wireless smart devices produce a considerable amount of EMD that can cause communication failures. Communication failures typically result in abandoned transactions or extended transaction times due to communication retries.

To address this problem, a wireless smart device reader can be equipped with a noise filter to block the excessive noise. Although a noise filter is designed to differentiate noise from valid signal data, most noise filters are not 100% reliable. Namely, a noise filter may fail to detect the start of the real data transmission if noise is generated around the same time actual data is to be transmitted to the wireless smart device reader. For example, the noise filter detects noise and subsequently disposes of the noise, but may miss the start of a valid data transmission since the turnaround time (e.g., the amount of time in which a reader detects noise, disposes of the noise, and prepares for receiving more data) is too long. Consequently, by the time the filter is ready to check for noise, a portion of the valid transmission has already passed.

Accordingly, there exists a need for a system, method, and computer product for mitigating signal noise at a wireless smart device reader.

SUMMARY

According to one aspect, the subject matter described herein includes a method for mitigating signal noise at a wireless smart device reader. The method, which is performed at a wireless smart device reader, includes receiving a signal from a wireless smart device and checking for an error in a portion of the signal. In response to detecting the error, an error flag is set in an error register to indicate the presence of noise in the signal portion. The error register is repeatedly polled in order to detect the setting of the error flag. In response to detecting the setting of the error flag, a command to eliminate the signal portion is issued.

The subject matter described herein for mitigating signal noise at a wireless smart device reader may be implemented using a computer program product comprising computer executable instructions embodied in a computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for mitigating signal noise at a wireless smart device reader described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
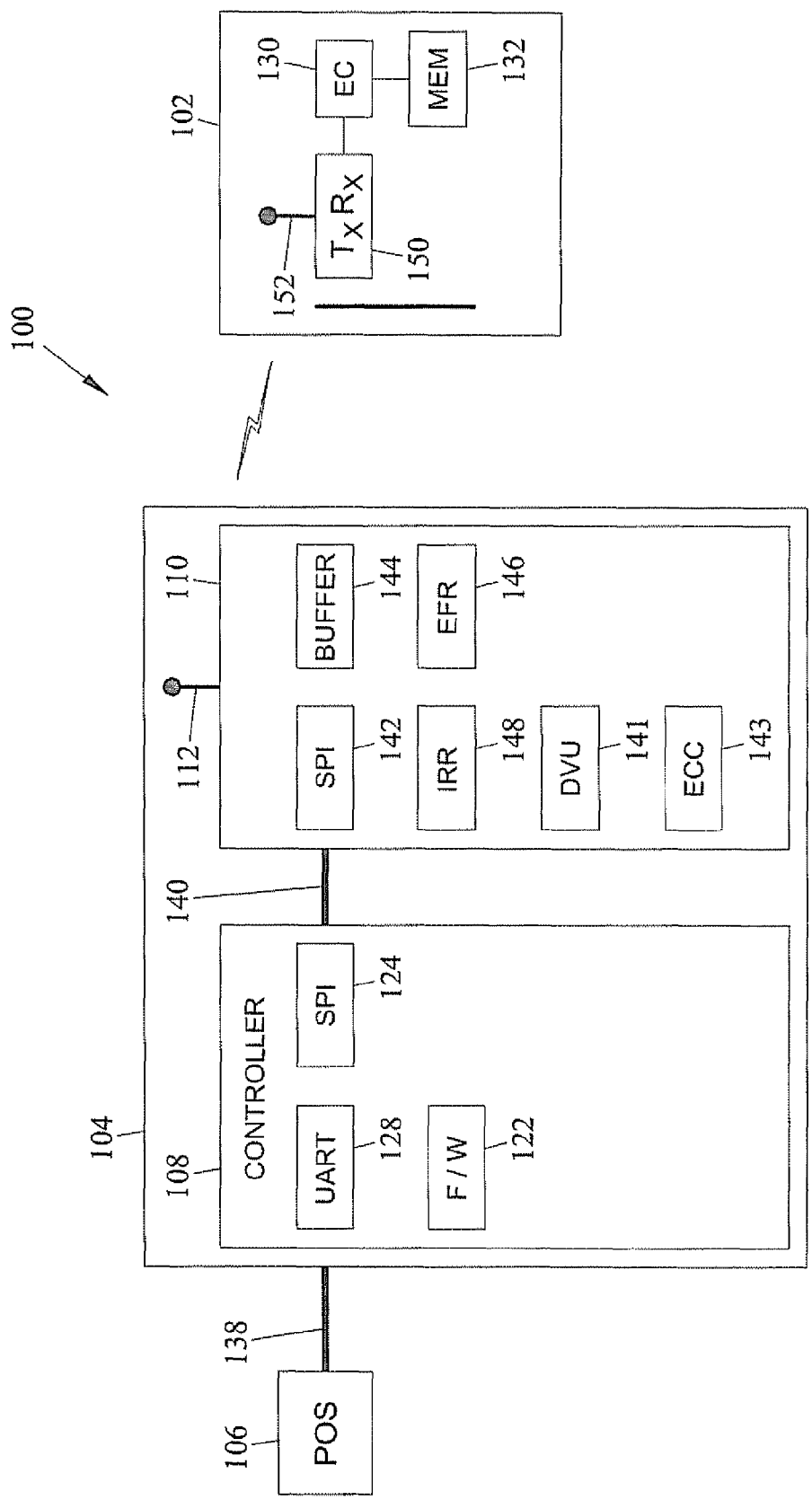
FIG. 1 is a block diagram illustrating an exemplary wireless smart device reader utilized in a contactless payment system according to an embodiment of the subject matter described herein.

The subject matter described herein includes systems, methods, and computer program products for mitigating signal noise at a wireless smart device reader. FIG. 1 is a block diagram illustrating an exemplary wireless smart device reader 104 according to an embodiment of the subject matter therein. In one embodiment, wireless smart device reader 104 is a component in a contactless payment system 100 that also includes a wireless smart device 102 (e.g., a contactless card)

and a point of sale (POS) unit 106. Point of sale (POS) unit 106 may include any point-of-sale terminal, such as a cash register, a magstripe reader with a keypad, or the like. In one embodiment, POS unit 106 is coupled to wireless smart device reader 104 via a communications cable 138.

Wireless smart device 102 may include a radio frequency identification (RFID) card, a credit card with an embedded wireless chip, an NFC-enabled phone, or any other like card capable of supporting wireless or contactless payment transactions. In one embodiment, a wireless smart device includes an embedded chip 130 (e.g., a secure microcontroller or like device), internal memory 132, and a small transceiver chipset 150 for transmitting and receiving radio frequency (RF) signals via built-in antenna 152. Although shown to be separate components in FIG. 1, embedded chip 130, internal memory 132 and transceiver chipset 150 may reside on a common chip in one embodiment. Wireless smart devices have the ability to securely manage, store and provide access to data on the card, perform on-card functions (e.g., encryption), and interact intelligently with wireless smart device reader 104.

Wireless smart device reader 104 may include any contactless device reader that is capable of reading wireless smart devices or any other contactless payment type cards. In one embodiment, wireless smart device reader 104 includes a controller 108 and a transceiver chip 110. Controller 108 may include any processor, microcontroller, or central processing unit (CPU) capable of executing computer programs (e.g., software, firmware, etc.) that control reading, writing, and processing functions for device reader 104. In one embodiment, controller 108 may include an embedded ARM based processor (e.g., an ARM7 processor) that is configured to execute firmware 122. Firmware 122 may include any type of software used for the operation of wireless smart device reader 104, such as monitoring and communicating with (e.g., send commands to) transceiver chip 110. Controller 108 may also include a serial port interface (SPI) 124 and a universal asynchronous receiver/transmitter (UART) unit 128. SPI 124 may be used as a means to communicate with transceiver chip 110 via SPI link 140. Various commands, such as read commands or polling commands, from controller 108 may be communicated to transceiver chip 110 over SPI link 140 using SPI 124. Controller 108 also includes UART unit 128, which may be used to communicate with POS 106 via a UART Link 138.

Transceiver chip 110 may include any device, such as a radio controller chip, that is capable of transmitting radio frequency (RF) signals to, and receiving RF signals from, wireless smart device 102. In one embodiment, transceiver chip 110 includes SPI 142, a buffer 144, an error field register 146, and an interrupt request register 148, a data validation unit (DVU) 141, error check circuitry 143, and antenna 112. In one embodiment, transceiver chip 110 is the component responsible for controlling and monitoring antenna 112 for signals received from wireless smart devices. Antenna 112 may also include a transducer element that transmits an electromagnetic field. Antenna 112 may use the electromagnetic field to establish a connection with built-in antenna 152 on wireless smart device 102. For example, wireless smart device 102 is able to modulate or load the electromagnetic field to communicate back to wireless smart device reader 104. In one embodiment, antenna 112 may include a closed loop antenna or the like.

SPI 142 may include of a series of pins that may be configured to enable serial communication with SPI 124 (via SPI link 140). Buffer 144 may include a first in, first out (FIFO) buffer adapted to temporarily store incoming data for processing as well as temporarily storing outgoing data prior to transmission. Interrupt request register 148 and error flag register 146 are storage areas that contain information that may be used to trigger the operation of the present subject matter. For example, interrupt request register 148 may provide information as to the operational status of transceiver chip 110. In one embodiment, during operation, interrupt request register 148 contains an interrupt request byte, whose bits represent different states or events. For example, the setting of a specific bit may represent the completion of a transaction or event, such as a timer expiring, the completion of a data transmission, the completion of data reception, the entering of an idle mode, and FIFO capacity alerts (e.g., almost full or almost empty). In one embodiment, a given bit or flag may be used to prompt the initiation of a hardware interrupt. Similarly, error flag register 146 may provide information as to the type of errors that exist in the data received from wireless smart device 102. For example, each bit (or error flag) of the error flag byte associated with error flag register 146 may represent a specific type of error (e.g., parity, CRC, framing, etc.) exhibited by the data contained in buffer 144. In one embodiment, error flag register 146 is associated with a specific memory location that contains a byte of data whose bits serve as error flags which may be used to indicate whether the data collected in buffer 144 is noise or valid data. Both registers 146 and 148 may be accessed by controller 108 via polling commands.

DVU 141 may include a chipset or other component that is responsible for validating data that is received by transceiver chip 110. For example, DVU 141 may handle the modulation and demodulation of data received from wireless smart device 102 as well as validating incoming data by checking for framing errors as well as setting the different error bits. Error check circuit 143 may include any module or circuitry that is adapted to perform one or more error checks (e.g., frame error check, parity error check, CRC error check, etc.) on the signaling data successfully received by transceiver chip 110. In one embodiment, error check circuit 143 includes digital hardware embodied in silicon that inspects incoming data by using a shift register. Error check circuit 143 may inspect a byte of signal data (i.e., a signal portion) and pass it to buffer 144.

As previously mentioned, the present subject matter is adapted to mitigate signal noise in wireless smart device reader 104. In one embodiment, noise is initially created by wireless smart device 102 after being introduced to the electromagnetic field generated by wireless smart device reader 104 (e.g., a handshaking procedure). In order to communicate, transceiver chip 110 may transmit a command signal to wireless smart device 102 via the electromagnetic field (i.e., a detector field). For example, by oscillating the electromagnetic field on and off very quickly, transceiver chip 110 is able to send a command as a string of data to wireless smart device 102. Similarly, by drawing power from the electromagnetic field, wireless smart device 102 is able to send a response to wireless smart device reader 104 by creating a short circuit on its own antenna 152. The short circuit produces a larger load on antenna 112, which is promptly detected as a communication from wireless smart device 102.

Figure 2:
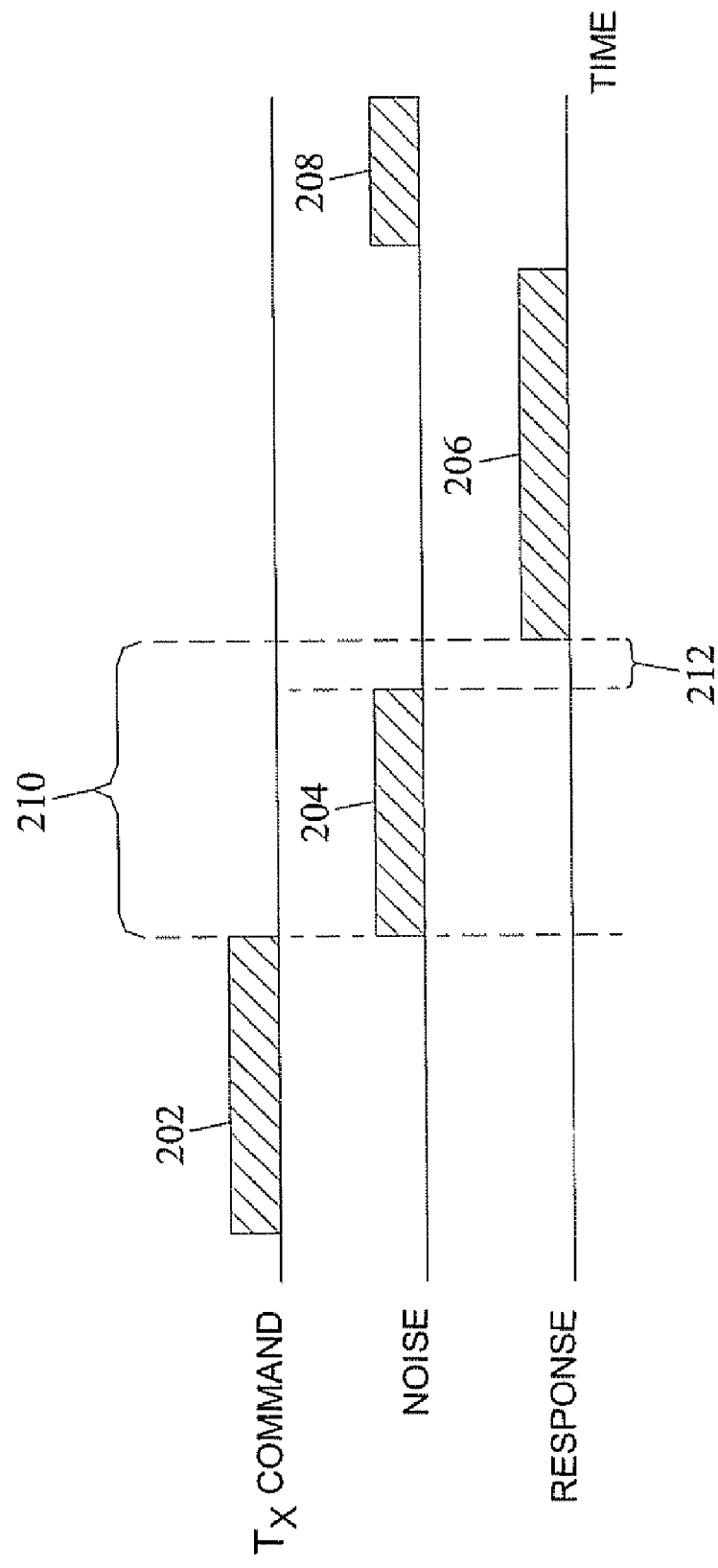
FIG. 2 is a diagram illustrating the presence of noise during a command and response transaction.

As wireless smart device reader 104 and wireless smart device 102 communicate in the aforementioned manner, signal noise may be introduced. For example, FIG. 2 illustrates an exemplary command and response communication event between wireless smart device reader 104 and wireless smart device 102. In one embodiment, firmware 122 initiates a command 202 (e.g., a request for account information) transmitted by transceiver chip 110 to wireless smart device 102. Upon receiving the signal, wireless smart device 102 processes the command, which in turn generates noise 204. In one embodiment, wireless smart device 102 constantly generates noise during its normal operation. The noise 204 generated by wireless smart device 102 is inadvertently transmitted to wireless smart device reader 104 and received by transceiver chip 110. After completing the processing of the received command, wireless smart device 102 transmits a prepared response 206 to wireless smart device reader 104. Notably, there is a short time period immediately preceding response 206 in which noise is not generated and transmitted to wireless smart device reader 104. This time period is represented as envelope 212 and may be, for example, 200 microseconds in duration. After response 206 has been transmitted, signal noise generation resumes and is represented as noise 208.

In one embodiment, problems may arise when the detected noise is in proximity to the start or end of valid data. For example, error check circuit 143 may classify an analyzed portion of signal as noise if the signal portion contains both valid signal data and noise. This may be caused by wireless smart device reader 104 having a turnaround time (i.e., the time it takes to detect noise, flush the buffer, and be prepared to accept data again) that is larger than envelope 212. Consequently, valid data may be lost and the command/response event will need to be restarted in order to receive the valid data in its entirety. In order to avoid this problem, the turnaround time of the present subject matter is configured with regard to the time period associated with envelope 212. More specifically, since noise is not transmitted within envelope 212, wireless smart device reader 104 can be configured so that its turnaround time is compressed to a period that is shorter than the envelope time period. Notably, if the turnaround time is less than envelope 212, it is impossible to capture a signal portion that contains both noise and valid data.

In one embodiment, the turnaround period may be reduced by eliminating the time associated with executing a hardware interrupt. Normally, wireless smart device reader 104 is configured to wait for controller 108 to execute a hardware interrupt that flushes buffer 144. Specifically, a hardware interrupt to clear buffer 144 may be caused by the detection of an error, the setting of an error flag register 146, which in turn causes interrupt request register 148 to be triggered. Notably, this process takes some time and may extend the aforementioned turnaround time. Conversely, this process may be truncated in one embodiment of the present subject matter such that error flag register 146 is monitored because it reflects errors prior to the interrupt register detecting an event that leads to a hardware interrupt process. For example, firmware 122 is configured to poll error flag register 146 by sending messages requesting the error flag byte. By detecting the occurrence of an error before a hardware interrupt is triggered, firmware 122 may be adapted to flush buffer 144 before the hardware interrupt executes the task. This saves valuable turnaround time.

In one embodiment, firmware 122 may be configured to poll (i.e., monitor) error flag register 146 in transceiver chip 110. As mentioned previously, error check circuit 143 is able to detect noise by analyzing incoming data to determine if any framing, parity, or CRC errors are present in the signaling data that passes through DVU 141. Namely, the presence of one or more of these errors may indicate the presence of noise data. However, before the error check processing can be completed, the examined data is forwarded (in the interest of processing efficiency) to buffer 144 for temporary storage regardless of whether an error is detected or not. In one embodiment, error check circuit 143 is configured to inspect a byte of data (i.e., a signal portion) at a time using a shift register. The inspected signal portion usually leaves error check circuit 143 and forwarded to buffer 144 by the time the error is actually detected. After completing the error check on the signal portion and detecting an error (e.g., lack of a valid frame, lack of parity, lack of a valid CRC), error check circuit 143 sends a signal to error flag register 146 in order to set an appropriate bit that indicates an error exists in the signal portion data currently stored in buffer 144.

During this time, firmware 122 is constantly polling error flag register 146 by transmitting continuous requests for the error flag byte. In one embodiment, transceiver chip 110 is configured to obtain the error flag byte information from error flag register 146 and provide it to controller 108 via SPI link 140. Upon receiving the byte, firmware 122 then locally inspects the error flag byte to determine if a particular error flag bit is set. For example, if an error flag bit is set to a low state (i.e., 0), then this may indicate that an error does not exist. Alternatively, if an error bit is high (i.e., 1), then this may indicate the presence of a specific error (i.e., the position of the set bit specifies the error type). In one embodiment, a specific error flag bit may be designated for each of a key error, an access error, a FIFO buffer overflow, a CRC error, a framing error, a parity error, a collision error, and the like.

Normally, the presence of a set error flag bit in error flag register 146 causes an interrupt bit in interrupt request register 148 to be set. Upon detecting the interrupt bit, wireless smart device reader 104 may then be configured to initiate a hardware interrupt process, which causes the controller 108 to flush buffer 144. However, because firmware 122 is continuously polling error flag register 146 in the present subject matter, controller 108 is able to detect the error before the hardware interrupt is executed. In one embodiment, firmware 122 may be configured to send a command to transceiver chip 110 instructing it to flush buffer 144 in response to detecting a set error bit in the error flag data byte. By flushing buffer 144, immediately upon the detection of an error (as opposed to waiting for a hardware interrupt), the turnaround time of transceiver 110 is reduced In one embodiment, the turnaround period may be reduced by using the integrated SPI of controller 108. By using automatic detection of the processor type allows for the use of the integrated SPI. For example, turnaround times using an integrated SPI may be in the range of 10-40 microseconds compared to 20-75 microseconds exhibited by non-integrated SPIs. With some versions of controller 108, the use of an integrated SPI interface is not provided for. Firmware 122 is able to detect whether controller 108 is a type of controller that has an integrated SPI interface support built in. If an integrated SPI interface is detected, firmware 122 enables the interface in order to take advantage of the speed benefits.

In addition to detecting errors and noise disruptions, wireless smart device reader 104 may encounter other difficulties when communicating with wireless smart device 102. For example, the presence of excessive noise may cause wireless smart device reader 104 to enter an idle state or cause a communications dropout. Specifically, transceiver chip 110 may enter an idle state if a noise error is so extreme that valid data is completely compromised to the point where it is impossible to detect the end of a transaction. Ultimately, transceiver chip 110 recognizes that it is not in a valid command/response state and sets an interrupt request bit. The detection of an idle state (via the set interrupt request bit) causes the reader to terminate the transaction and possibly restart the command/response function.

A dropout may be described as a complete shutdown of wireless smart device 102, which can be triggered by the wireless smart device's energy requirements. For example, when processing a command or performing intensive calculations, wireless smart device 102 may consume a significant amount of current that can cause wireless smart device 102 to temporarily cease functioning. When a dropout occurs, wireless smart device reader 104 detects that data (of any type) is not being received. In this scenario, there is no mechanism to inform controller 108 to abort the communication with wireless smart device 102 except for the expiration of a timeout period or having transceiver chip 110 entering an idle mode.

A timeout period (e.g., a global timeout period) is typically set to a sufficient duration in order to safeguard several types of failures. In the event of the dropout, a user may be inconvenienced by a long global timeout periods. Namely, the timeout period is used as a time limit to receive valid data. However, if a dropout occurs, valid data will not be forthcoming and the transaction time could be increased by 5.2 seconds per try, for example. Upon the expiration of a timeout period, wireless smart device reader 104 may be configured to perform a task such as retry a command/response event or terminate a transaction.

When a dropout occurs, the resulting absence of communications is detected by a timeout period. In one embodiment, a low level timeout period is implemented to detect a dropout that may occur between command 202 and response 206 and respond more quickly than a high level global timeout. Notably, the low level timeout is used to ensure that a maximum time for response 206 to be received is not exceeded. Similarly, the high level global timeout is used to detect dropouts that occur during the time when response data has started to be received and the end of transmitted data (i.e., time period of response 206). Namely, a global timeout addresses the area that is not covered by the low level timeout period.

Since the presence of noise is an indicator of a possible dropout of wireless smart device 102 (e.g., device 102 draws current to process a command, which in turn, generates noise), the present subject matter may be configured to adjust one or more timeout periods. For example, controller 108 may be configured to accelerate the global timeout period in response to detecting an error in the error flag byte. In one embodiment, controller accelerates the global timeout period to 100 milliseconds. By decreasing the global timeout period to 100 milliseconds, the turnaround time to re-initiate the command/response function is reduced if a dropout does occur. At the same time, if a dropout does not occur, then there is still ample time for a response (i.e., valid data) to be received. For example, if the detected noise is just a spike occurring between the command and response, then the detection of the noise using the error flag byte causes buffer 144 to be flushed and the global timeout is accelerated. Valid data (i.e., response 206) is subsequently received and controller 108 functions properly since the global timeout is not exhausted.

Alternatively, if the noise occurs and the wireless smart device 102 drops out (or if noise occurs in close proximity to the valid data and both the noise and valid data are collectively flushed), the global timeout is still reduced to 100 milliseconds in response to the noise, but no data is received. When the global timeout expires, the routine is exited, which causes the entire command/response function to be retried.

Figure 3:
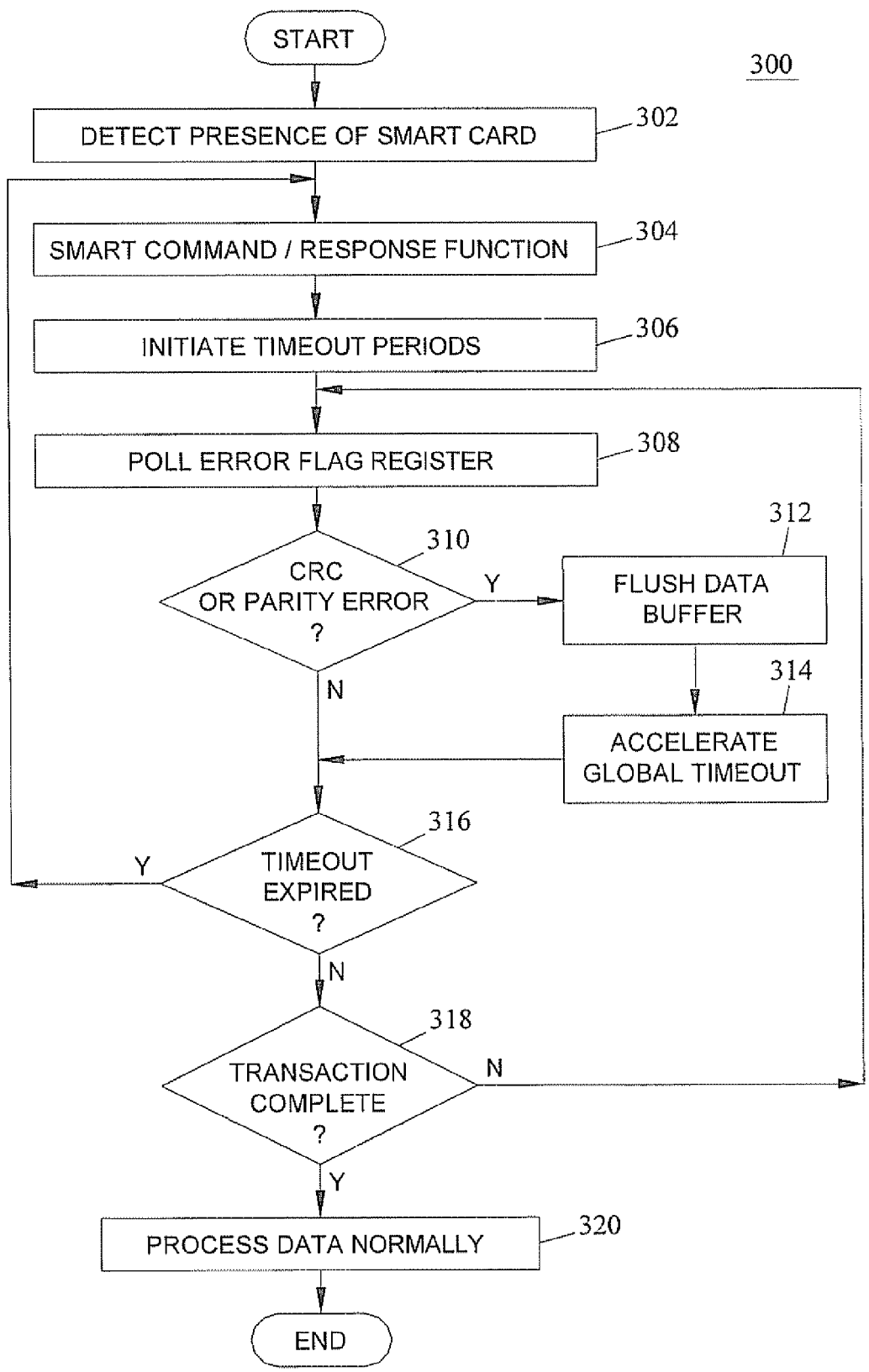
FIG. 3 is a flow diagram illustrating the steps of an exemplary method for mitigating signal noise in a wireless smart device reader according to an embodiment of the subject matter described herein.

FIG. 3 is a flow diagram illustrating the steps of an exemplary method 300 for mitigating signal noise at wireless smart device reader 104 according to an embodiment of the subject matter described herein. Referring to FIG. 3, in block 302, wireless smart device reader 104 receives a signal from wireless smart device 102. In one embodiment, wireless smart device reader 104 generates an electromagnetic field that is transmitted by antenna 112. When wireless smart device 102 is placed within the electromagnetic field of device reader 104 (e.g., presenting a contactless card for a payment transaction), a signal is transmitted from wireless smart device 102 to wireless smart device reader 104. The signal notifies wireless smart device reader 104 that wireless smart device 102 is ready to conduct a transaction. In one embodiment, wireless smart device 102 may perform an initialization process or perform a handshaking procedure with wireless smart device reader 104 after receiving the initial signal.

In block 304, a command/response function is initiated. In one embodiment, firmware 122 in wireless smart device reader 104 calls a command/response function that transmits a command to wireless smart device 102. For example, smart device reader 104 may issue a command requesting data (e.g. account information) from wireless smart device 102 in order to proceed with a payment transaction.

In block 306, timeout periods are initiated. In one embodiment, wireless smart device reader 104 initiates a high level global timeout and a low level timeout. The global timeout may be operated by controller 108 and is used for canceling transactions that exceed a predefined timeout limit (e.g., 5.2 seconds). If the command/response transaction is not completed by this time (including retries), then controller 108 may restart the process by sending the initial command once more. Upon the expiration of the global timeout period, an interrupt flag is set and subsequently detected via the polling of firmware 122.

Similarly, a low level timeout controlled by transceiver chip 110 may be initiated. The low level timeout is used to limit the maximum response time that transpires from the last bit of the command (e.g., command 202 in FIG. 2) to the first bit of the response (e.g., response 206 in FIG. 2). In one embodiment, this low level timeout is built into transceiver chip 110. Moreover, this low level timeout is defaulted for some card commands and set dynamically for others as requested by wireless smart device 102. The periods for the low level timeout may be tied with wireless smart device 102 and compliance agency requirements.

When either of the low level timeout or high level global timeout expires, wireless smart device reader 104 is adapted to terminate the transaction. If the transaction is terminated due to either the expiration of the low level timeout or the global timeout, an interrupt wireless smart device reader 104 may be configured to retry the transaction by resending the initial command. In one embodiment, if three retries fail, then the entire transaction fails.

In block 308, an error flag register 146 in transceiver chip 110 is polled. In one embodiment, firmware 122 requests the error flag register data in the error flag register 146 in transceiver chip 110 in order to monitor for errors. For example, error flag register 146 may provide access to a byte of information (e.g., error flag byte) in which bits are associated to different errors. Upon receiving the polling request, transceiver chip 110 provides error flag register data (i.e., an error flag byte) to controller 108. In one embodiment, the polling conducted in block 308 is performed repeatedly via the transmission of constant polling messages.

In block 310, a determination is made as to whether a parity error or CRC error is detected. In one embodiment, firmware 122 inspects the error flag byte received in response to the polling command sent in block 308. Firmware 122 inspects the error flag byte to see if one or more specific bits are set, which indicates an error, such as a parity error or CRC error, is present in buffer 144. The error flag byte may include an error flag bit if error check circuit 143 sets the bit after detecting an error. In one embodiment, a unique bit in error flag byte indicates if each of a CRC error or parity error exists. If a CRC or parity error exists, then method 300 continues to block 312. Otherwise, method 300 proceeds to block 316 where the expiration of a timeout period is checked. Notably, the error may be detected in a manner that is independent of the generation of a hardware interrupt related to the error.

Also, in one embodiment, framing errors may be neglected in block 310 since data containing framing errors (in buffer 144) may still be useful to controller 108. This mechanism enables controller 108 to address errors detected at the end of response 206. For example, firmware 122 may be configured to ignore framing errors in block 310, thereby letting them pass through because the associated data contained in buffer 144 may still include valid data.

In block 312, buffer 144 is flushed. Upon detecting that data buffer 144 contains noise (as indicated by set error flag bit), wireless smart device reader 104 transmits a command instructing transceiver chip 110 to flush the noise data contained within buffer 144. By disposing of noise data associated with CRC and parity errors, transceiver chip 110 is able to eliminate noise before it is provided to controller 108. Similarly, by flushing buffer 144 before a hardware interrupt performs the flushing operation, the turnaround time is reduced.

In block 314, a timeout period is reduced. In one embodiment, smart device reader 104 forces a global timeout to expire at 100 milliseconds. By accelerating the global timeout in this manner, wireless smart device reader 104 is able to retry the transaction sooner in the event a dropout occurs. More specifically, if the error was caused by communication dropout, it will recover faster and in a manner transparent to a user. In an alternate embodiment, a separate 100 millisecond timer may be established in controller 108 instead of accelerating the existing global timeout.

In block 316, a determination as to whether a timeout (e.g., a global timeout or a low level timeout) period has expired is made. If the timeout period has expired, then method 300 loops back to block 304 where the command/response function is restarted. If the timeout period has not expired, method 300 continues to block 318.

In block 318, a determination is made as to whether the transaction has been completed. If the transaction is not complete, then method 300 loops back to step 308 to poll the error flag register. Otherwise, method 300 continues to block 320 where data is processed normally.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for mitigating signal noise in a wireless smart device reader,
the method comprising:
at a wireless smart device reader:
receiving a signal from a wireless smart device;
checking for an error in a portion of the signal;
in response to detecting the error, setting an error flag in an error register to indicate the detection of the error in the signal portion;
repeatedly polling the error register to detect the setting of the error flag; and
in response to detecting an error setting of the error flag, issuing a command to eliminate the signal portion containing the error.

2. The method of claim 1 wherein the signal portion is placed in a buffer in the wireless smart device reader in response to the setting of the error flag.

3. The method of claim 2 wherein issuing a command to eliminate the signal portion includes issuing a command to flush the buffer that contains the signal portion.

4. The method of claim 1 further comprising, in response to receiving the command, eliminating the signal portion, and reducing a predefined timeout period.

5. The method of claim 4 wherein expiration of the predefined timeout period causes the wireless smart device reader to send a command that requests a new signal from the wireless smart device.

6. The method of claim 4 wherein the predefined timeout period is disregarded in the event the wireless smart device reader does not detect an error in any of the portions of the signal.

7. The method of claim 1 wherein checking for an error includes checking the signal portion for at least one of a parity error, a framing error, and a cyclic redundancy check error.

8. The method of claim 1 wherein the error flag includes at least one bit in an error flag byte contained in the error register.

9. The method of claim 8 wherein the position of the at least one bit in the error flag byte indicates whether the error is at least one of a parity error, a framing error, and a cyclic redundancy check error.

10. The method of claim 8 wherein polling the error register comprises transmitting a request message for the error flag byte contained in the error flag register and analyzing the position of the at least one bit in the error flag byte.

11. A wireless smart device reader for mitigating signal noise comprising:
a transceiver for receiving a signal from a wireless smart device, checking for an error in a portion of the signal, setting an error flag in an error flag register to indicate the detection of an error in the signal portion; and
a controller for repeatedly polling the error flag register to detect the setting of the error flag, and issuing a command to eliminate the signal portion containing the error in response to detecting an error setting of the error flag.

12. The wireless smart device reader of claim 11 comprising a buffer, wherein the transceiver is adapted to place the signal portion in the buffer in response to the setting of the error flag.

13. The wireless smart device reader of claim 12 wherein the controller is adapted to issue a command to flush the buffer that contains the signal portion.

14. The wireless smart device reader of claim 11 wherein the controller, in response to receiving the command, eliminates the signal portion, and is adapted to reduce a predefined timeout period.

15. The wireless smart device reader of claim 14 wherein the transceiver is adapted to send a command that requests a new signal from the wireless smart device in response to the expiration of the predefined timeout period.

16. The wireless smart device reader of claim 14 wherein the controller disregards the predefined timeout period in the event the transceiver does not detect an error in any of the portions of the signal.

17. The wireless smart device reader of claim 11 wherein the transceiver is adapted to check the signal portion for at least one of a parity error, a framing error, and a cyclic redundancy check error.

18. The wireless smart device reader of claim 11 wherein the error flag includes at least one bit in an error flag byte contained in the error register.

19. The wireless smart device reader of claim 18 wherein the position of the at least one bit in the error flag byte indicates whether the error is at least one of a parity error, a framing error, and a cyclic redundancy check error.

20. The wireless smart device reader of claim 18 wherein the controller is adapted to transmit a request message for the error flag byte contained in the error flag register and analyze the position of the at least one bit in the error flag byte.

21. A computer program product comprising computer executable instructions embodied in a computer readable medium for performing steps comprising:
  at a wireless smart device reader:
  receiving a signal from a wireless smart device;
  checking for an error in a portion of the signal;
  in response to detecting the error, setting an error flag in an error flag register to indicate the presence of an error in the signal portion;
  repeatedly polling the error flag register to detect the setting of the error flag; and
  in response to detecting an error setting of the error flag, issuing a command to eliminate the signal portion containing the error.

* * * * *